(12) United States Patent
Lacroix et al.

(10) Patent No.: US 7,022,768 B1
(45) Date of Patent: Apr. 4, 2006

(54) THERMOPLASTIC POLYESTERS WITH IMPROVED SHOCK-PROOF PROPERTIES AND IMPACT MODIFYING COMPOSITION

(75) Inventors: Christophe Lacroix, Harquency (FR); Alain Bouilloux, Bernay (FR); Claude Granel, Philadelphia, PA (US); Michael Tran, Abington, PA (US)

(73) Assignee: Atofina, Puteaux (FR)

(*) Notice: Subject to any disclaimer, the term of this patent is extended or adjusted under 35 U.S.C. 154(b) by 54 days.

(21) Appl. No.: 10/130,993

(22) PCT Filed: Nov. 23, 2000

(86) PCT No.: PCT/FR00/03260

§ 371 (c)(1),
(2), (4) Date: Sep. 17, 2002

(87) PCT Pub. No.: WO01/38437

PCT Pub. Date: May 31, 2002

(30) Foreign Application Priority Data

Nov. 26, 1999 (FR) .................................... 99 14913

(51) Int. Cl.
*C08L 67/02* (2006.01)
(52) U.S. Cl. ......................................... 525/166; 525/64
(58) Field of Classification Search ................. 525/64, 525/166
See application file for complete search history.

(56) References Cited

U.S. PATENT DOCUMENTS

| | | | |
|---|---|---|---|
| 3,287,443 A | 11/1966 | Saito et al. | |
| 3,657,391 A | 4/1972 | Curfman | |
| 3,808,180 A | 4/1974 | Owens | |
| 3,985,704 A | 10/1976 | Jones et al. | |
| 4,096,202 A | 6/1978 | Farnham et al. | |
| 4,180,494 A | 12/1979 | Fromuth et al. | |
| 4,260,693 A | 4/1981 | Liu | |
| 4,299,928 A | 11/1981 | Witman | |
| 4,659,767 A * | 4/1987 | Dunkle et al. | 524/504 |
| 4,753,890 A | 6/1988 | Smith-Lewis et al. | |
| 5,115,012 A * | 5/1992 | Howe | 524/456 |
| 5,208,292 A * | 5/1993 | Hert et al. | 525/166 |
| 5,321,056 A * | 6/1994 | Carson et al. | 523/201 |
| 5,369,154 A | 11/1994 | Laughner | |
| 5,652,306 A * | 7/1997 | Meyer et al. | 525/64 |
| 5,773,520 A | 6/1998 | Bertelo et al. | |
| 5,814,712 A * | 9/1998 | Gallucci et al. | 525/436 |
| 5,824,412 A * | 10/1998 | Hausmann | 428/378 |
| 6,111,012 A * | 8/2000 | Fischer et al. | 525/64 |
| 6,180,251 B1 * | 1/2001 | Kanai et al. | 428/457 |

FOREIGN PATENT DOCUMENTS

| | | |
|---|---|---|
| EP | 0 115 015 | 8/1984 |
| EP | 0 133 993 | 9/1985 |
| EP | 0 174 343 | 3/1986 |
| EP | 0 187 650 | 7/1986 |
| EP | 0 511 475 | 11/1992 |
| EP | 0 531 008 | 3/1993 |
| EP | 0 573 680 A | 12/1993 |
| EP | 0 653 461 A | 5/1995 |
| EP | 0 737 715 | 10/1996 |
| EP | A 776 915 | 6/1997 |
| EP | 0 803 537 | 10/1997 |
| EP | 0 838 501 A | 4/1998 |
| JP | 1-247454 | 10/1989 |

OTHER PUBLICATIONS

International Preliminary Examination Report (PCT/IPEA/409 and PCT/IPEA/416) (translated) issued for PCT/FR00/03260.

* cited by examiner

*Primary Examiner*—Jeffrey B. Robertson
(74) *Attorney, Agent, or Firm*—Smith, Gambrell & Russell, LLP

(57) ABSTRACT

The invention concerns thermoplastic polyesters (such as PET or PBT) comprising, by weight, the total being 100%: 60 to 99% of thermoplastic polyester; 1 to 40% of impact modifier comprising: (a) a core-shell copolymer (A), (b) an ethylene copolymer (B) selected among ethylene copolymers (B1) and an unsaturated carboxylic acid anhydride, ethylene copolymers (B2) and an unsaturated epoxy compound and mixtures thereof, (c) a copolymer (C) selected among ethylene copolymers (C1) and an alkyl (meth)acrylate, ethylene copolymers (C2) and (meth)acrylic acid optionally neutralised and mixtures thereof. The invention also concerns an impact modifying composition which can be added in thermoplastic polyesters to improve their shock-proof properties and comprising constituents (A), (B) and (C).

15 Claims, 8 Drawing Sheets

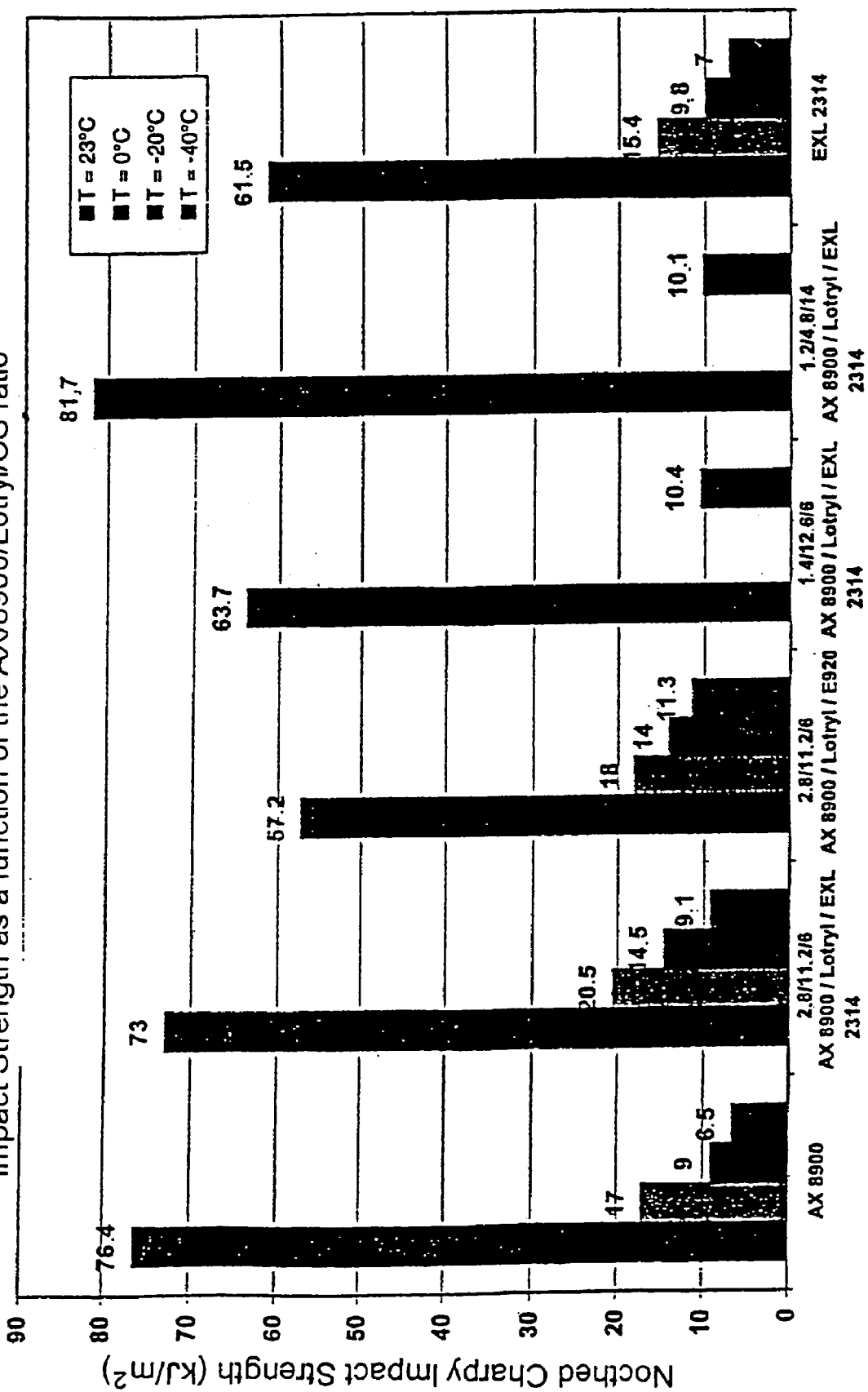

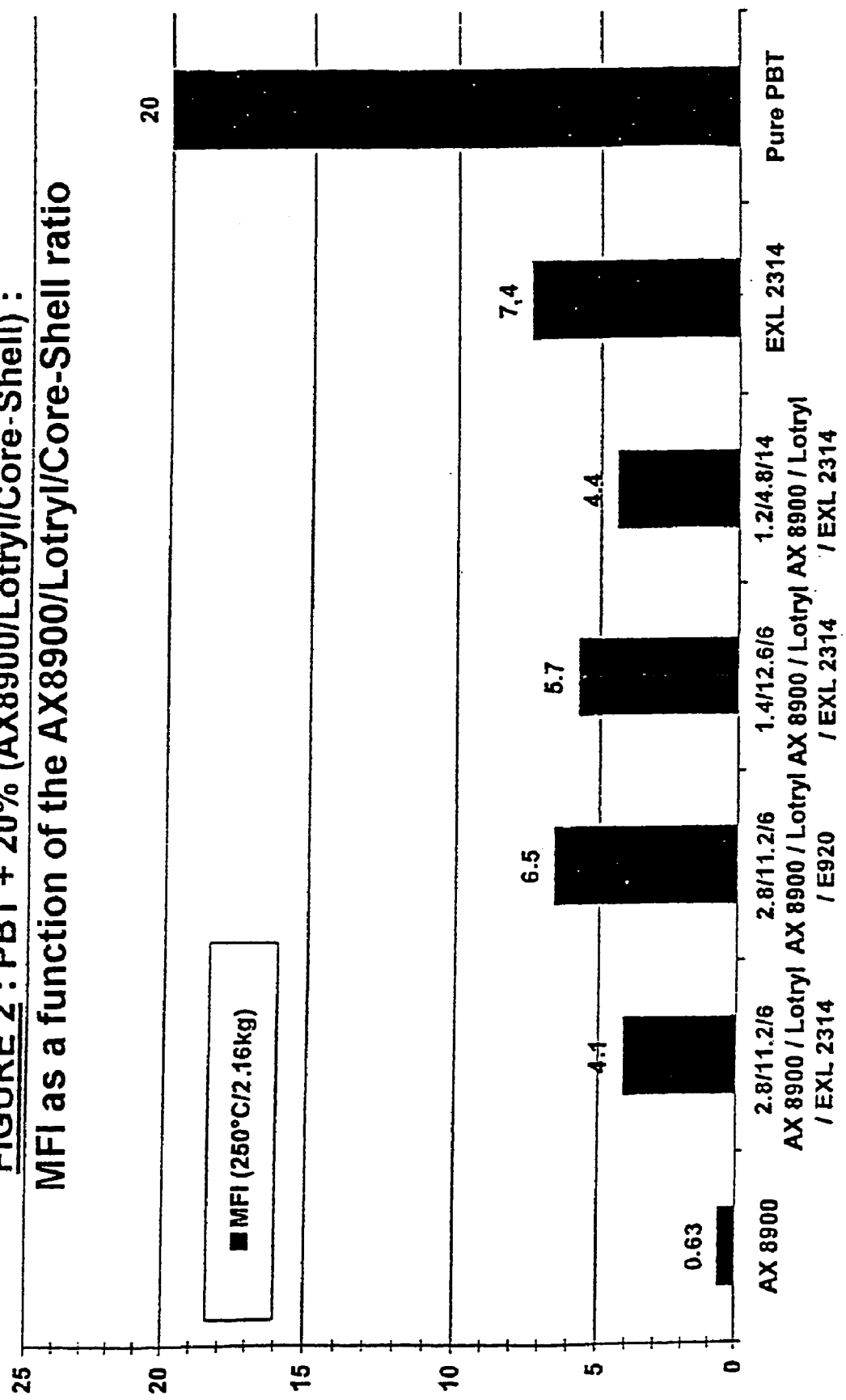

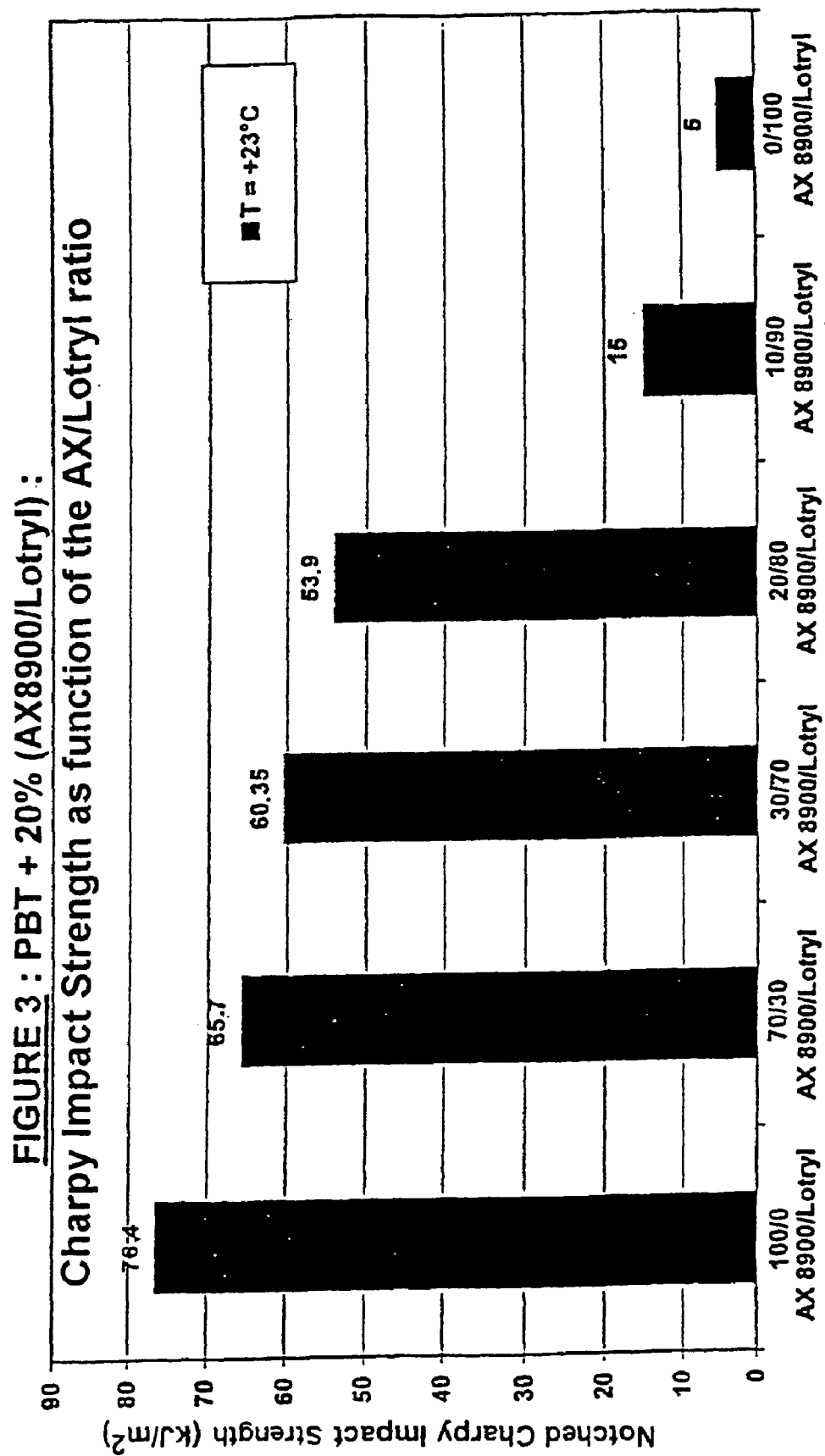

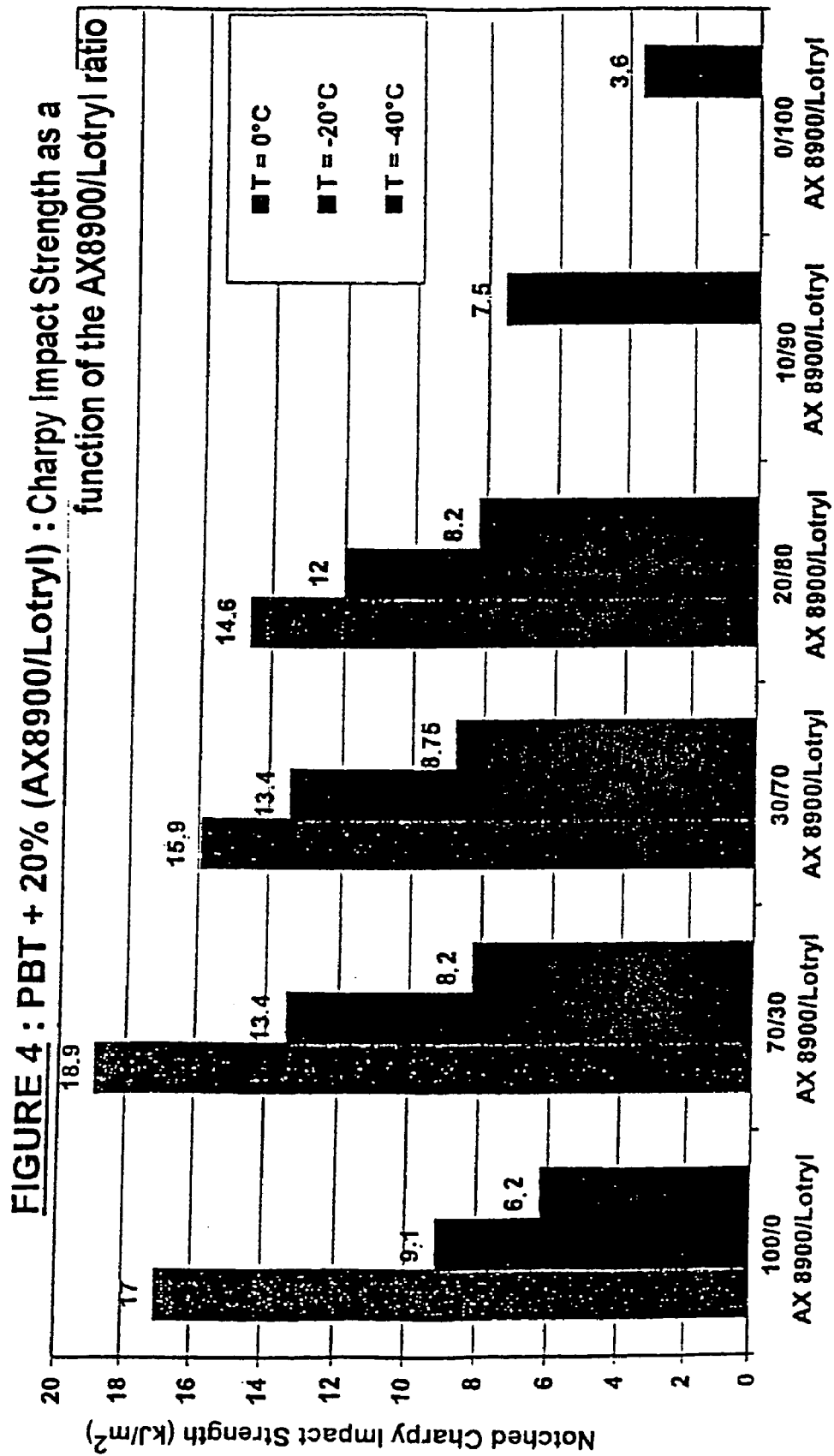

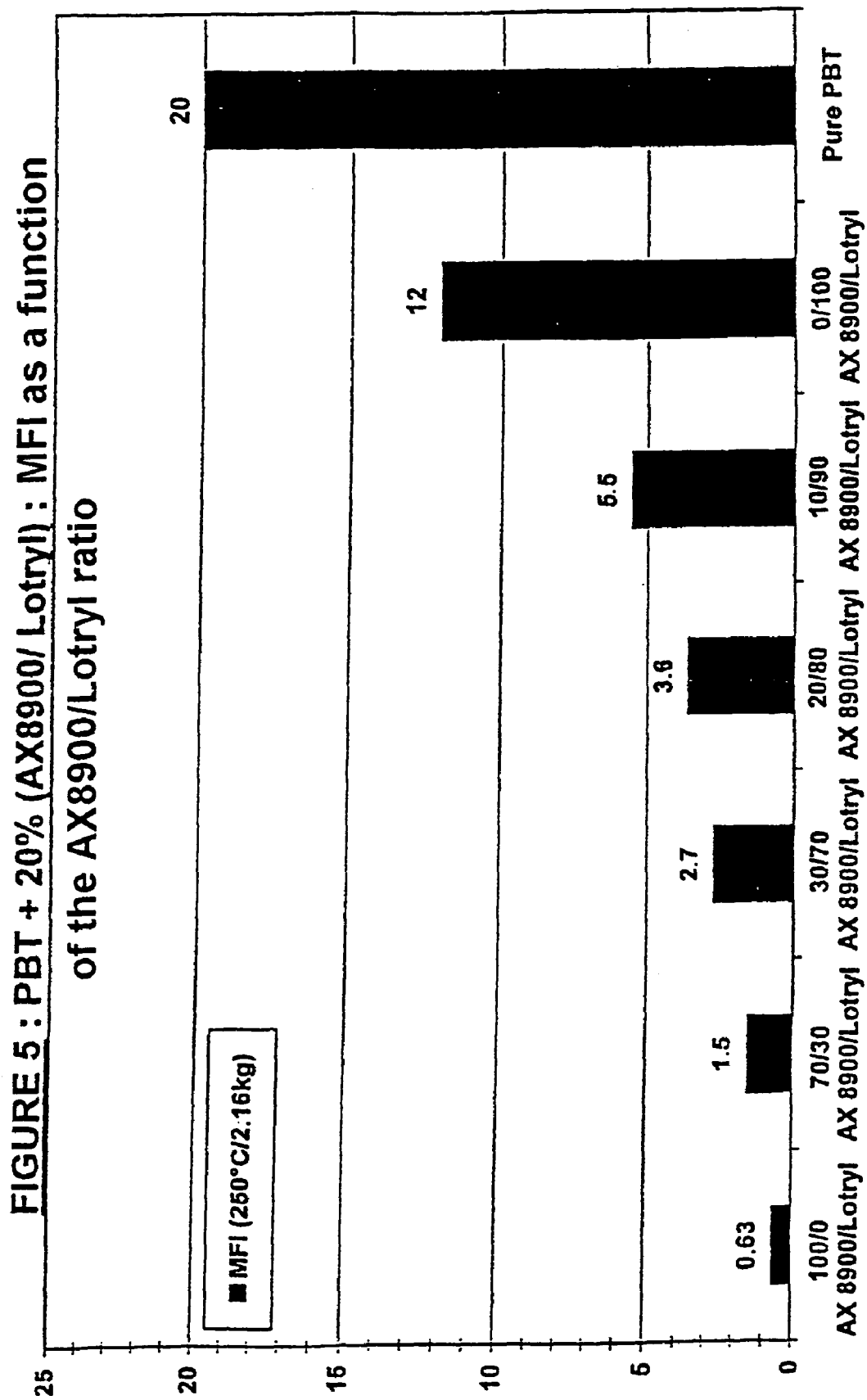

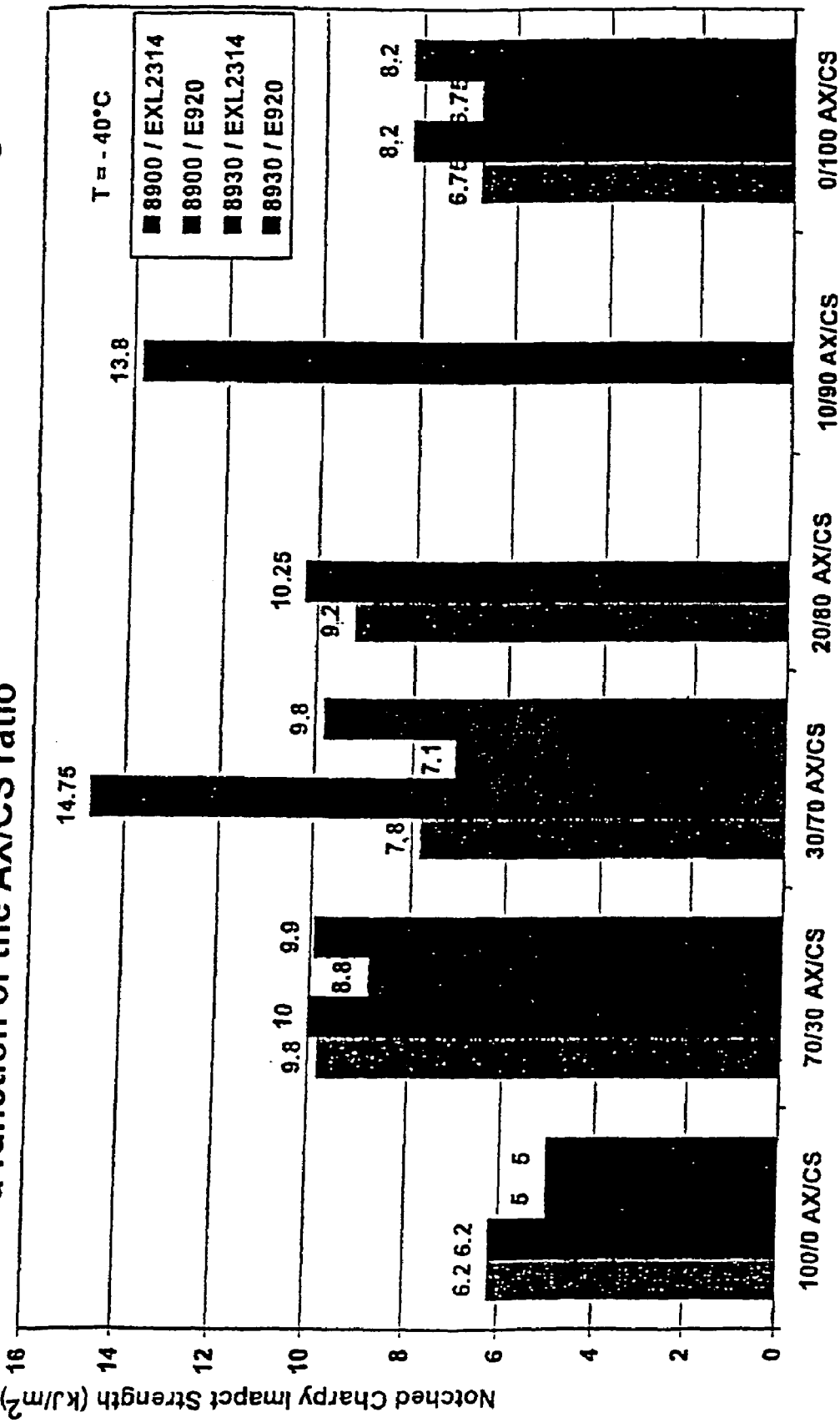

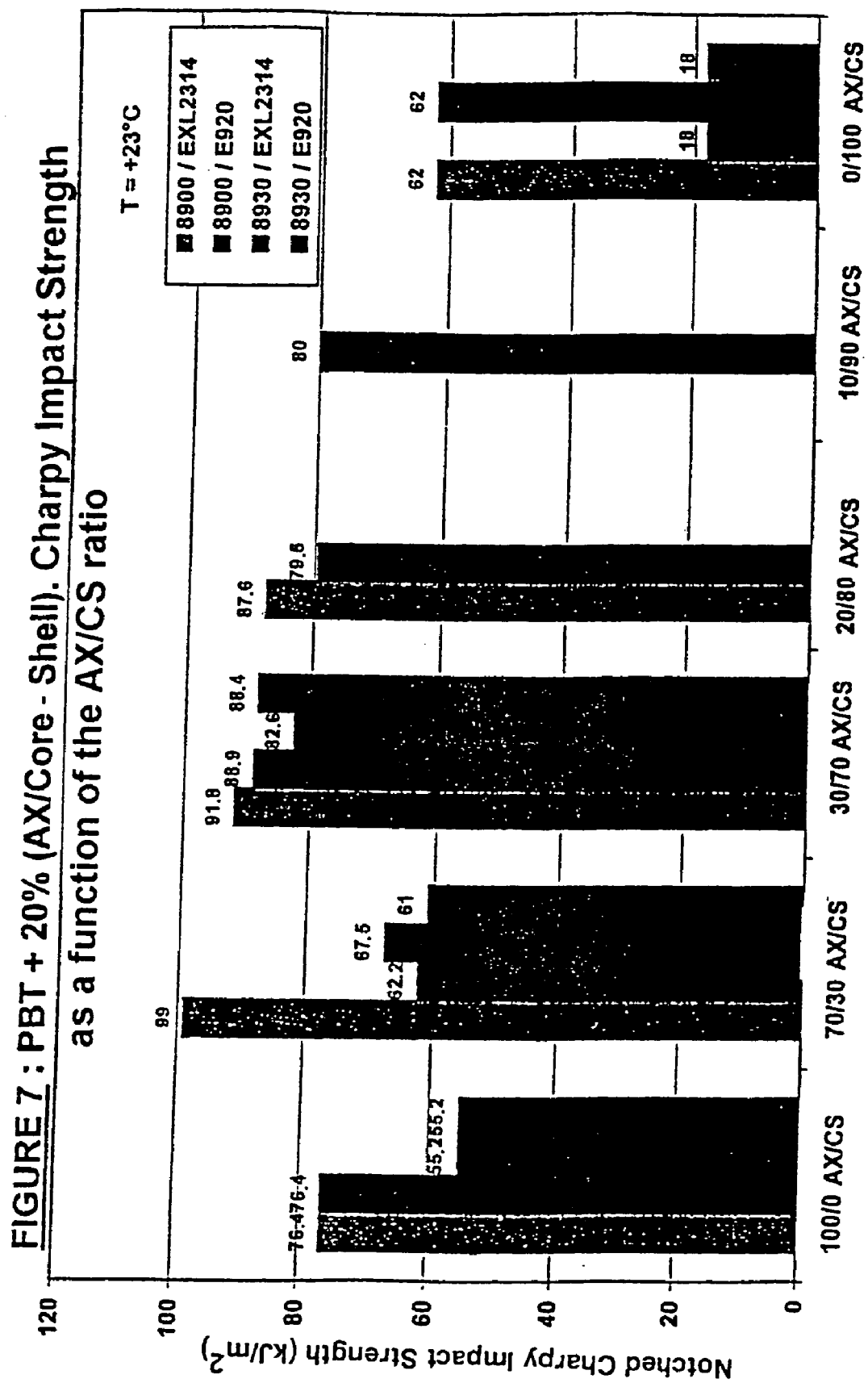

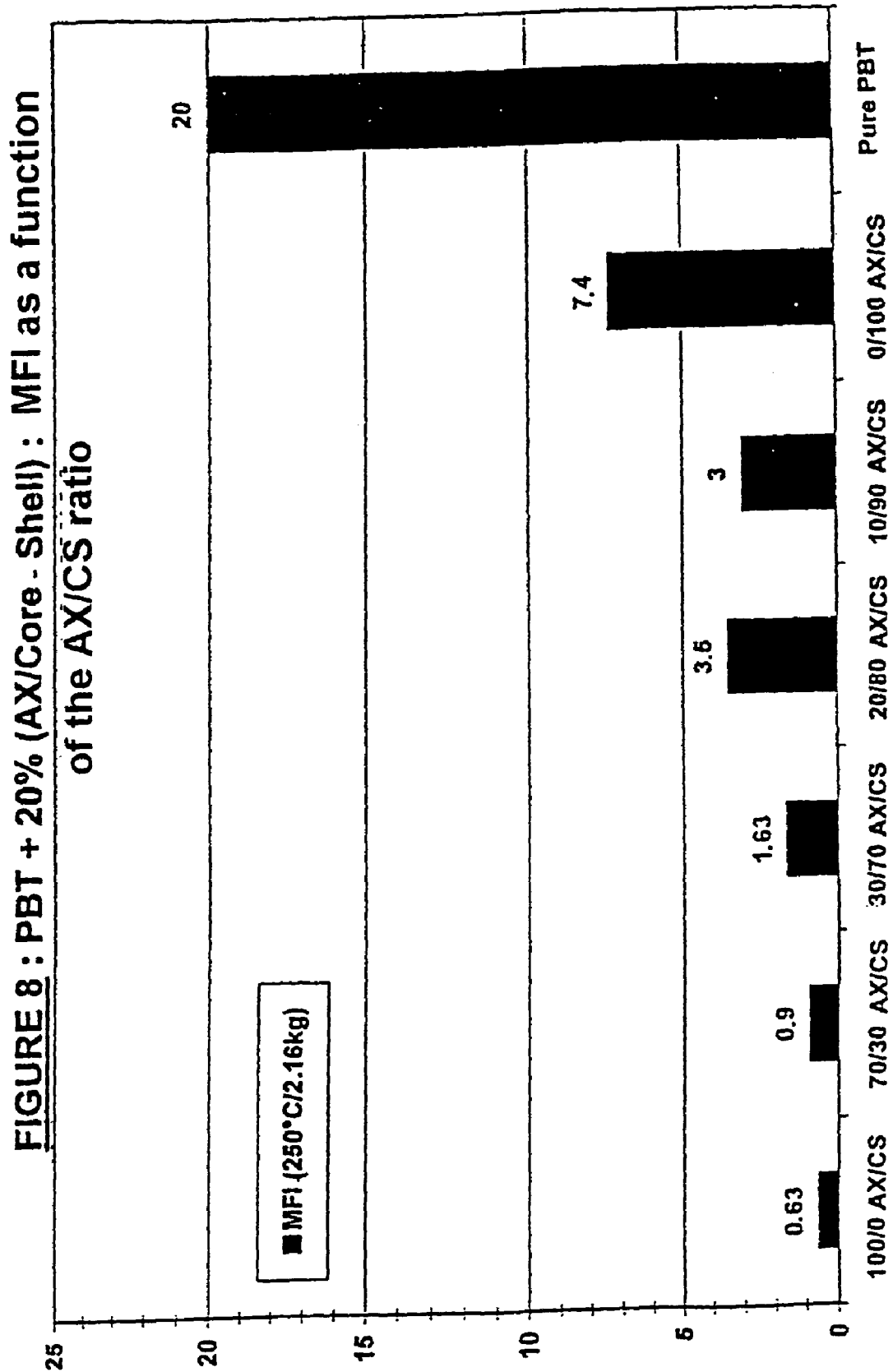

THERMOPLASTIC POLYESTERS WITH IMPROVED SHOCK-PROOF PROPERTIES AND IMPACT MODIFYING COMPOSITION

FIELD OF THE INVENTION

The present invention relates to thermoplastic polyesters having improved impact properties and to impact-modifier compositions.

BACKGROUND OF THE INVENTION

Thermoplastic polyesters, such as PBT (polybutylene terephthalate) and PET (polyethylene terephthalate) possess excellent dimensional-stability, heat-resistance and chemical-resistance properties which are used in the electrical, electronic and motor-vehicle fields. However, at high temperature, during conversion operations, a reduction in the molecular weight of the polymer may occur, leading to a reduction in the impact strength properties. In addition, polyesters have poor fracture-resistance properties in the case of notched components.

The present invention provides thermoplastic polymers in which an impact-modifier composition is added in order to obtain improved impact properties, including low-temperature toughness. The present invention also relates to this impact-modifier composition that is added to the polyesters to improve the impact properties thereof. These modifier compositions make it possible to achieve impact properties superior to those obtained with each of the compounds separately.

Patent U.S. Pat. No. 4,753,890 (=EP 174,343) describes polyesters, such as polyethylene terephthalate (PET) or polybutylene terephthalate (PBT) modified by ethylene-alkyl (meth)acrylate-glycidyl (meth)acrylate copolymers.

Patent EP 737,715 describes PBTs modified by a blend of an ethylene-methyl methacrylate-glycidyl methacrylate copolymer and of a copolymer of the core-shell type. These core-shell copolymers comprise fine particles having an elastomer core and a thermoplastic shell.

Patent EP 531,008 describes PBT/polycarbonate blends containing copolymer core-shells and copolymers which are either ethylene-glycidyl methacrylate copolymers or ethylene-vinyl acetate-glycidyl methacrylate copolymers.

Patent U.S. Pat. No. 5,369,154 describes PET/polycarbonate blends containing four different modifiers: a copolymer comprising an epoxide, a copolymer core-shell, an SBR- or SBS- or EPR-type elastomer and an SAN- or ABS-type copolymer.

Patent EP 115,015 describes PET or PBT containing linear low-density polyethylene (LLDPE), glass fibres and optionally a core-shell copolymer.

Patent EP 133,993 describes PET containing a core-shell copolymer and a copolymer of ethylene with either an alkyl acrylate or (meth)acrylic acid.

Japanese Patent Application JP 01,247,454 A, published on 3 Oct. 1989 describes PBT containing an ethylene-alkyl (meth)acrylate copolymer and an ethylene-glycidyl methacrylate copolymer.

Patents EP 838,501 and EP 511,475 describe compositions similar to those of the above Japanese application.

Patent EP 803,537 describes PET and polycarbonate containing a copolymer comprising glycidyl methacrylate. Firstly, the polycarbonate and the copolymer comprising glycidyl methacrylate are blended together and then this blend is incorporated into the PET.

Patent EP 187,650 describes PET containing a core-shell copolymer and a copolymer of ethylene with either maleic anhydride or a (meth)acrylic acid.

It has been seen from the prior art that saturated polyesters can have their impact properties improved by the addition of a core-shell copolymer. These polymers have a particularly well defined structure in which the core consists of a polymer having an elastomeric character and in which the shell has a thermoplastic character. It has also been seen that the improvement in impact strength may be obtained by also incorporating a dispersed phase of an impact modifier optionally containing reactive functional groups capable of reacting with the functional groups of the polyesters. This reactivity makes it possible to ensure a fine and homogeneous dispersion of the modifier as well as good adhesion. The core-shell copolymer may itself also be functionalized in order to allow better adhesion to the matrix. However, this reactivity is sometimes high and may lead to a reduction in the melt flow index. This reduction in the melt flow index is prejudicial to the injection moulding of large parts or of fine parts.

It has now been found that it is possible to improve the impact properties of thermoplastic polyesters by adding to them three kinds of modifier, namely: (a) a core-shell copolymer, (b) an ethylene-unsaturated epoxide copolymer or an ethylene-unsaturated carboxylic acid anhydride copolymer or blends thereof and (c) an ethylene-alkyl (meth)acrylate copolymer or an optionally neutralized ethylene-(meth)acrylic acid copolymer or blends thereof. This modification does not result in a drop in the melt flow index compared with the prior art and even improves it. These modifiers improve the impact strength properties either at room temperature or at low temperatures, depending on the ratio which is chosen between the three components (a), (b) and (c), compared with compositions encountered in patents EP 511,475 and EP 174,343. They also allow the material to have better melt flow compared with compositions as described in EP 737,715.

The present invention relates to thermoplastic polyester compositions comprising, by weight, the total being 100%:
  60 to 99% of a thermoplastic polyester;
  1 to 40% of an impact modifier comprising:
   (a) a core-shell copolymer (A);
   (b) an ethylene copolymer (B) chosen from ethylene-unsaturated carboxylic acid anhydride copolymers (B1), ethylene-unsaturated epoxide copolymers (B2) and blends thereof;
   (c) a copolymer (C) chosen from ethylene-alkyl (meth)acrylate copolymers (C1), optionally neutralized ethylene-(meth)acrylic acid copolymers (C2) and blends thereof.

The present invention also relates to an impact-modifier composition which can be added to thermoplastic polyesters to improve their impact properties and which comprise:
  (a) a core-shell copolymer (A);
  (b) an ethylene copolymer (B) chosen from ethylene-unsaturated carboxylic acid anhydride copolymers (B1), ethylene-unsaturated epoxide copolymers (B2) and blends thereof;
  (c) a copolymer (C) chosen from ethylene-alkyl (meth)acrylate copolymers (C1), optionally neutralized ethylene-(meth)acrylic acid copolymers (C2) and blends thereof.

DESCRIPTION OF THE INVENTION

The term "MFI" (standing for Melt Flow Index) denotes the melt flow index in g/10 minutes at a given temperature and under a given load.

The term "thermoplastic polyester" denotes polymers which are saturated products coming from the condensation of glycols and of dicarboxylic acids, or of their derivatives. Preferably, they comprise the products of the condensation of aromatic dicarboxylic acids having from 8 to 14 carbon atoms and of at least one glycol chosen from the group consisting of neopentyl glycol, cyclohexanedimethanol and aliphatic glycols of formula $HO(CH_2)_nOH$ in which n is an integer ranging from 2 to 10. Up to 50 mol % of the aromatic dicarboxylic acid may be replaced with at least one other aromatic dicarboxylic acid having from 8 to 14 carbon atoms, and/or up to 20 mol % may be replaced with an aliphatic dicarboxylic acid having from 2 to 12 carbon atoms.

The preferred polyesters are polyethylene terephthalate (PET), poly(1,4-butylene) terephthalate (PBT), 1,4-cyclohexylene dimethylene terephthalate/isophthalate) and other esters derived from aromatic dicarboxylic acids such as isophthalic acid, dibenzoic acid, naphthalene dicarboxylic acid, 4,4'-diphenylenedicarboxylic acid, bis(p-carboxyphenyl)methane acid, ethylene bis(p-benzoic) acid, 1,4-tetramethylene bis(p-oxybenzoic) acid, ethylene bis(para-oxybenzoic) acid, 1,3-trimethylene bis(p-oxybenzoic) acid, and glycols such as ethylene glycol, 1,3-trimethylene glycol, 1,4-tetramethylene glycol, 1,6-hexamethylene glycol, 1,3-propylene glycol, 1,8-octamethylene glycol and 1,10-decamethylene glycol.

The MFI of these polyesters, measured at 250° C. and with 2.16 kg or 5 kg (for PBT) or at 275° C. and with 2.16 kg (for PET), may vary from 2 to 100 and advantageously from 10 to 80.

It would not be outside the scope of the invention if the polyesters consisted of several diacids and/or several diols. It is also possible to use a blend of various polyesters.

It would not be outside the scope of the invention if the polyesters contained copolyetheresters. These copolyetheresters are copolymers containing polyester blocks and polyether blocks having polyether units derived from polyetherdiols such as polyethylene glycol (PEG), polypropylene glycol (PPG) or polytetramethylene glycol (PTMG), dicarboxylic acid units such as terephthalic acid units, and short, chain-extender, diol units such as glycol (1,2-ethanediol) or 1,4-butanediol. The linking of the polyethers with the diacids forms the flexible segments whereas the linking of the glycol or butanediol with the diacids forms the rigid segments of the copolyetherester. These copolyetheresters are thermoplastic elastomers. The proportion of these copolyetheresters may represent from 0 to 500 parts per 100 parts of thermoplastic polyester.

It would not be outside the scope of the invention if the polyesters contained polycarbonate. In general, the term "polycarbonate" denotes polymers comprising the following units:

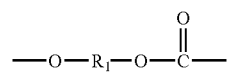

in which $R_1$ is an aliphatic, alicyclic or aromatic divalent group which may contain up to 8 carbon atoms. By way of example of $R_1$, mention may be made of ethylene, propylene, trimethylene, tetramethylene, hexamethylene, dodecamethylene, poly(1,4-[2-butenylene]), poly(1,10-[(2-ethyldecylene]), 1,3-cyclopentylene, 1,3-cyclohexylene, 1,4-cyclohexylene, m-phenylene, p-phenylene, 4,4'-diphenylene, 2,2-bis(4-phenylene)propane and benzene-1,4-dimethylene. Advantageously, at least 60% of the $R_1$ groups in the polycarbonate and preferably all the groups $R_1$ are aromatic groups of formula:

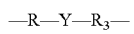

in which $R_2$ et $R_3$ are divalent monocyclic aromatic radicals and Y is a linking radical containing one or two atoms which separate $R_2$ and $R_3$. The free valences are generally in the meta or para position with respect to Y. $R_2$ and $R_3$ may be substituted or unsubstituted phenylenes; as substituents, mention may be made of alkyl, alkenyl, halogen, nitro and alkoxy. Preferably, the phenylenes are unsubstituted; they may be together or separately meta or para and are preferably para. The linking radical Y is preferably such that one atom separates $R_2$ from $R_3$ and is preferably a hydrocarbon radical such as methylene, cyclohexylmethylene, 2-[2.2.1] bicycloheptylmethylene, ethylene, 2,2-propylene, 1,1-(2,2-dimethylpropylene), 1,1-cyclohexylene, 1,1-cyclopentadecylene, cyclo-dodecylene, carbonyl, the oxy radical, the thio radical and sulfone. Preferably, $R_1$ is 2,2-bis(4-phenylene)propane which comes from bisphenol A, that is to say Y is isopropylidene and $R_2$ and $R_3$ are each p-phenylene. Advantageously, the intrinsic viscosity of the polycarbonate, measured in methylene chloride at 25° C., is between 0.3 and 1 dl/g.

The proportion of polycarbonate may represent from 0 to 300 parts per 100 parts of thermoplastic polyester.

With regard to the core-shell copolymer (A), abbreviated as CS in what follows, this is in the form of fine particles having an elastomer core and at least one thermoplastic shell. The particle size is generally between 50 and 1000 nm and advantageously between 100 and 500 nm.

By way of example of the core, mention may be made of isoprene homopolymers or butadiene homopolymers, copolymers of isoprene with at most 30 mol % of a vinyl monomer and copolymers of butadiene with at most 30 mol % of a vinyl monomer. The vinyl monomer may be styrene, an alkylstyrene, acrylonitrile or an alkyl (meth)acrylate. Another core family consists of the homopolymers of an alkyl (meth)acrylate and the copolymers of an alkyl (meth) acrylate with at most 30 mol % of a vinyl monomer. The alkyl (meth)acrylate is advantageously butyl acrylate. The vinyl monomer may be styrene, an alkylstyrene, acrylonitrile, butadiene or isoprene. The core of the copolymer (A) may be completely or partly crosslinked. All that is required is to add at least difunctional monomers during the preparation of the core; these monomers may be chosen from poly(meth)acrylic esters of polyols, such as butylene di(meth)acrylate and trimethylolpropane trimethacrylate. Other difunctional monomers are, for example, divinylbenzene, trivinylbenzene, vinyl acrylate and vinyl methacrylate. The core can also be crosslinked by introducing into it, by grafting or as a comonomer during the polymerization, unsaturated functional monomers such as anhydrides of unsaturated carboxylic acids, unsaturated carboxylic acids and unsaturated epoxides. Mention may be made, for example, of maleic anhydride, (meth)acrylic acid and glycidyl methacrylate.

The shell(s) are styrene homopolymers, alkylstyrene homopolymers or methyl methacrylate homopolymers, or copolymers comprising at least 70 mol % of one of the above monomers and at least one comonomer chosen from the other above monomers, vinyl acetate and acrylonitrile. The shell may be functionalized by introducing into it, by grafting or as a comonomer during the polymerization, unsaturated functional monomers such as anhydrides of unsaturated carboxylic acids, unsaturated carboxylic acids and unsaturated epoxides. Mention may be made, for example, of maleic anhydride, (meth)acrylic acid and glycidyl methacrylate.

By way of example, mention may be made of core-shell copolymers (A) having a polystyrene shell and core-shell copolymers (A) having a PMMA shell. There are also core-shell copolymers (A) having two shells, one made of polystyrene and the other, on the outside, made of PMMA. Examples of copolymers (A) and their method of preparation are described in the following patents: U.S. Pat. No. 4,180,494, U.S. Pat. No. 3,808,180, U.S. Pat. No. 4,096,202, U.S. Pat. No. 4,260,693, U.S. Pat. No. 3,287,443, U.S. Pat. No. 3,657,391, U.S. Pat. No. 4,299,928 and U.S. Pat. No. 3,985,704.

By way of example, mention may be made of core-shell copolymers (A) having a core based on an alkyl acrylate or on a polyorganosiloxane rubber or a mixture thereof and a shell based on a polyalkyl methacrylate or a styrene-acrylonitrile copolymer, characterized in that the said impact additive comprises:

a) 70 to 90% by weight of an elastomeric crosslinked core which is composed:
   1) of 20 to 100% by weight, and preferably 20 to 90%, of a core consisting of an n-alkyl acrylate copolymer (I), the alkyl group of which has a number of carbons ranging from 5 to 12 or a mixture of an alkyl acrylate, the linear or branched alkyl group of which has a number of carbons ranging from 2 to 12, or of a polyorganosiloxane rubber, of a polyfunctional crosslinking agent possessing in its molecule unsaturated groups, at least one of which is of the $CH_2=C<$vinyl type, and, optionally, of a polyfunctional grafting agent possessing in its molecule unsaturated groups, at least one of which is of the $CH_2=CH-CH_2-$ allyl type, the said core containing a molar quantity of crosslinking agent and, optionally, of a grafting agent ranging from 0.05 to 5%,
   2) of 80 to 0% by weight, and preferably 80 to 10% of a sheath surrounding the core and consisting of an n-alkyl acrylate copolymer (II), the alkyl group of which has a number of carbons ranging from 4 to 12 or of a mixture of alkyl acrylates as defined above in 1) and of a grafting agent possessing in its molecule unsaturated groups, at least one of which is of the $CH_2=CH-CH_2-$ allyl type, the said sheath containing a molar amount of grafting agent ranging from 0.05 to 2.5%;

b) 30 to 10% by weight of a shell grafted onto the said core consisting of a polymer of an alkyl methacrylate, the alkyl group of which has a number of carbons ranging from 1 to 4 or else of a random copolymer of an alkyl methacrylate, the alkyl group of which has a number of carbons ranging from 1 to 4 and of an alkyl acrylate, the alkyl group of which has a number of carbons ranging from 1 to 8, containing a molar amount of alkyl acrylate ranging from 5 to 40% or else consisting of a styrene-acrylonitrile copolymer.

Optionally, 0.1 to 50% by weight of the vinyl monomers possess functional groups.

This type of core-shell copolymer is described in the Applicant's Patent Application EP-A-776 915 and Patent U.S. Pat. No. 5,773,520.

By way of example, mention may be made of core-shell copolymers (A) consisting (i) of 75 to 80 parts of a core comprising at least 93 mol % of butadiene, 5 mol % of styrene and 0.5 to 1 mol % of divinylbenzene and (ii) of 25 to 20 parts of two shells essentially of the same weight, the inner one made of polystyrene and the outer one made of PMMA.

Advantageously, the core represents 70 to 90% by weight of (A) and the shell represents 30 to 10%.

With regard to ethylene-unsaturated carboxylic acid anhydride copolymers (B1), these may be polyethylenes grafted by an unsaturated carboxylic acid anhydride or ethylene-unsaturated carboxylic acid anhydride copolymers which are obtained, for example, by radical polymerization.

The unsaturated carboxylic acid anhydride may be chosen, for example, from maleic, itaconic, citraconic, allylsuccinic, cyclohex-4-ene-1,2-dicarboxylic, 4-methylenecyclohex-4-ene-1,2-dicarboxylic, bicyclo-[2.2.11]hept-5-ene-2,3-dicarboxylic and x-methylbicyclo-[2.2.11]hept-5-ene-2,2-dicarboxylic anhydrides. Advantageously, maleic anhydride is used. It would not be outside the scope of the invention to replace all or part of the anhydride with an unsaturated carboxylic acid such as, for example, (meth)acrylic acid.

With regard to the polyethylenes onto which the unsaturated carboxylic acid anhydride is grafted, the term "polyethylene" should be understood to mean homopolymers or copolymers.

By way of comonomers, mention may be made of:
   alpha-olefins, advantageously those having from 3 to 30 carbon atoms; by way of examples of alpha-olefins, mention may be made of propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-docosene, 1-tetracocene, 1-hexacocene, 1-octacocene and 1-triacontene; these alpha-olefins may be used separately or as a mixture of two or more of them;
   esters of unsaturated carboxylic acids, such as, for example, alkyl (meth)acrylates, the alkyls possibly having up to 24 carbon atoms; examples of alkyl acrylates or methacrylates are especially methyl methacrylate, ethyl acrylate, n-butyl acrylate, isobutyl acrylate and 2-ethylhexyl acrylate;
   vinyl esters of saturated carboxylic acids, such as, for example, vinyl acetate or vinyl propionate;
   dienes such as, for example, 1,4-hexadiene.
   the polyethylene may include several of the above comonomers.

Advantageously, the polyethylene, which may be a blend of several polymers, comprises at least 50 mol % and preferably 75 mol % of ethylene and its density may be between 0.86 and 0.98 g/cm$^3$. The MFI (at 190° C./2.16 kg) is advantageously between 0.1 and 1000.

By way of example of polyethylenes, mention may be made of:
   low-density polyethylene (LDPE)
   high-density polyethylene (HDPE)
   linear low-density polyethylene (LLDPE)
   very low-density polyethylene (VLDPE)

polyethylene obtained by metallocene catalysis, that is to say polymers obtained by the copolymerization of ethylene and of an alpha-olefin such as propylene, butene, hexene or octene in the presence of a single-site catalyst generally consisting of a zirconium or titanium atom and of two alkyl cyclic molecules linked to the metal. More specifically, the metallocene catalysts are usually composed of two cyclopentadiene rings linked to the metal. These catalysts are frequently used with aluminoxanes as cocatalysts or activators, preferably methylaluminoxane (MAO). Hafnium may also be used as the metal to which the cyclopentadiene is fixed. Other metallocenes may include transition metals of Groups IV A, V A and VI A. Metals from the series of lanthanides may also be used.

EPR (ethylene-propylene-rubber) elastomers;

EPDM (ethylene-propylene-diene) elastomers;

blends of polyethylene with an EPR or an EPDM;

ethylene-alkyl (meth)acrylate copolymers possibly containing up to 60%, and preferably 2 to 40%, by weight of (meth)acrylate.

The grafting is an operation known per se.

With regard to the ethylene-unsaturated carboxylic acid anhydride copolymers, that is to say those in which the unsaturated carboxylic acid anhydride is not grafted, these are copolymers of ethylene, the unsaturated carboxylic acid anhydride and, optionally another monomer which may be chosen from the comonomers mentioned above in the case of the ethylene copolymers intended to be grafted.

Advantageously, ethylene-maleic anhydride copolymers and ethylene-alkyl (meth)acrylate-maleic anhydride copolymers are used. These copolymers comprise from 0.2 to 10% by weight of maleic anhydride and from 0 to 40%, preferably 5 to 40%, by weight of alkyl (meth)acrylate. Their MFIs (190° C./2.16 kg) are between 0.5 and 200. The alkyl (meth)acrylates have already been described above. It is possible to use a blend of several copolymers (B1). It is also possible to use an ethylene-maleic anhydride copolymer/ethylene-alkyl (meth)acrylate-maleic anhydride copolymer blend.

The copolymer (B1) is commercially available—produced by radical polymerization at a pressure which may range between 200 and 2500 bar and is sold in the form of granules.

With regard to (B2), the ethylene-unsaturated epoxide copolymers may be obtained by the copolymerization of ethylene with an unsaturated epoxide or by grafting the unsaturated epoxide to the polyethylene. The grafting may be carried out in the solvent phase or onto the polyethylene in the melt in the presence of a peroxide. These grafting techniques are known per se. With regard to the copolymerization of ethylene with an unsaturated epoxide, it is possible to use so-called radical polymerization processes usually operating at pressures between 200 et 2500 bar. By way of example of unsaturated epoxides, mention may be made of:

aliphatic glycidyl esters and ethers, such as allyl glycidyl ether, vinyl glycidyl ether, glycidyl maleate, glycidyl itaconate, glycidyl acrylate and glycidyl methacrylate; and alicyclic glycidyl esters and ethers, such as 2-cyclohex-1-ene glycidyl ether, diglycidyl cyclohexene-4-5-carboxylate, glycidyl cyclohexene-4-carboxylate, glycidyl 2-methyl-5-norbornene-2-carboxylate and diglycidyl endo-cis-bicyclo[2.2.1]hept-5-ene-2,3-dicarboxylate.

With regard to grafting, the copolymer is obtained by grafting a polyethylene homopolymer or copolymer as described in the case of (B1) above, except that an epoxide is grafted instead of an anhydride.

With regard to copolymerization, the principle is similar to that described in the case of (B1) above except that an epoxide is used. There may also be other comonomers, as in the case of (B1).

The product (B2) is advantageously an ethylene-alkyl (meth)acrylate-unsaturated epoxide copolymer or an ethylene-unsaturated epoxide copolymer. Advantageously, it may contain up to 40%, preferably 5 to 40%, by weight of alkyl (meth)acrylate and up to 10%, preferably 0.1 to 8%, by weight of unsaturated epoxide.

Advantageously, the epoxide is glycidyl (meth)acrylate.

Advantageously, the alkyl (meth)acrylate is chosen from methyl (meth)acrylate, ethyl acrylate, n-butyl acrylate, isobutyl acrylate and 2-ethylhexyl acrylate. The amount of alkyl (meth)acrylate is advantageously from 20 to 35%. The MFI (at 190° C./2.16 kg) is advantageously between 0.5 and 200.

It is possible to use a blend of several copolymers (B2). It is also possible to use an ethylene-alkyl (meth)acrylate-unsaturated epoxide copolymer/ethylene-unsaturated epoxide copolymer blend.

This copolymer (B2) may be obtained by the radical polymerization of the monomers.

It is also possible to use a blend of copolymers (B1) and (B2).

With regard to the ethylene-alkyl (meth)acrylate copolymer (C1), the alkyls may have up to 24 carbon atoms. Examples of alkyl acrylates or methacrylates are especially methyl methacrylate, ethyl acrylate, n-butyl acrylate, isobutyl acrylate and 2-ethylhexyl acrylate. The MFI (at 190° C./2.16 kg) of these copolymers is advantageously between 0.1 and 50. The alkyl (meth)acrylate content may be up to 40% by weight of (C1). Advantageously, the (meth)acrylate content is between 5 and 35% by weight of (C1). These copolymers may be manufactured by radical polymerization in a tube or autoclave at pressures of between 300 and 2500 bar.

With regard to the ethylene-(meth)acrylic acid copolymers (C2), the (meth)acrylic acid content may be up to 10 mol %, and advantageously between 1 and 5 mol %, of (C2). It would not be outside the scope of the invention if (C2) were to contain an alkyl (meth)acrylate in a proportion possibly up to 40% by weight of (C2). The acid functions may be completely or partly neutralized by a cation, such as lithium, sodium, potassium, magnesium, calcium, strontium, zinc and cadmium. The MFI (at 190° C./2.16 kg) of these copolymers is advantageously between 0.1 and 50. These copolymers may be manufactured by radical polymerization in a tube or autoclave at pressures of between 300 and 2500 bar.

It is also possible to use a blend of copolymers (C1) and (C2).

Advantageously, the impact constituents are in the following proportions by weight for a total of 100%:

(A) 15 to 80%

(B) 5 to 60%

(C) 5 to 80%

| Particularly useful proportions are the following: | | | |
|---|---|---|---|
| A | 20 to 35 | 25 to 35 | 40 to 75 |
| B | 40 to 60 | 5 to 10 | 10 to 35 |
| C | 10 to 40 | 60 to 70 | 10 to 35 |
| A + B + C | 100 | 100 | 100 |

Advantageously, the thermoplastic polyester compositions of the invention comprise, per 100 parts by weight, 65 to 95 parts and 35 to 5 parts of polyester and of impact modifier, respectively.

The invention also relates to an impact-modifier composition having these proportions.

The thermoplastic polyesters of the invention may also include, in addition to the impact modifier, slip agents, heat stabilizers, antiblocking agents, antioxidants, UV stabilizers and fillers. The fillers may be glass fibres, fire retardants, talc or chalk. These fillers may be contained in the impact modifiers.

The thermoplastic polyester/impact-modifier blends are prepared by the usual techniques for thermoplastic polymers in single-screw or twin-screw extruders, mixers or apparatuses of the BUSS® Ko-kneader type. The polyester and the constituents of the impact modifier, namely the copolymers (A), (B) and (C), may be introduced separately into the blending device. The constituents of the impact modifier may also be added in the form of a blend prepared in advance, possibly in the form of a masterbatch in the polyester. The additives may be added into these apparatuses, such as the slip agents, the antiblocking agents, the antioxidants, the UV stabilizers and the fillers, whether as they are or in the form of a masterbatch in the polyester or else in the form of a masterbatch with one or more of the copolymers (A) to (C). The impact-modifier composition comprising (A) to (C) which may be added to the polyesters is also prepared by the previous usual technique of blending thermoplastic polymers.

EXAMPLES

All the examples were produced with compositions comprising, by weight, between 70 to 80% of polyester and between 30 to 20% of impact modifier. The impact modifier either consists of A, B and C, in the case of the examples according to the invention, or of A and B, or of B and C, or of A, or of B, or of C. The notched Charpy impact strength complies with the ISO 179:93 standard (with kJ/m$^2$ as unit of measure) and the notched Izod impact strength is measured according to the ASTM D256 standard (with pound-foot/inch as unit of measure)—the higher the measured impact-strength value the better the impact strength.

The examples below were produced with PBT or with PET as polyester.

The following examples were produced with compositions comprising 80% by weight of PBT and 20% by weight of impact modifier.

These examples were produced with the following products:
AX 8900: ethylene-methyl acrylate-glycidyl methacrylate (GMA) copolymer comprising, by weight, 25% acrylate and 8% GMA, having an MFI of 6 (190° C./2.16 kg). It is sold under the Atofina brand name LOTADER®;
AX 8930: ethylene-methyl acrylate-glycidyl methacrylate (GMA) copolymer comprising, by weight, 25% acrylate and 3% GMA, having an MFI of 6 (190° C./2.16 kg). It is sold under the Atofina brand name LOTADER®;
Lotryl: ethylene-2-ethylhexyl acrylate copolymer comprising 35% acrylate by weight and having an MFI of 2 (190° C./2.16 kg);
E920: MBS-type core-shell copolymer with a core essentially based on butadiene-styrene and a shell of PMMA, sold by Atofina under the brand name METABLEND®;
EXL 2314: epoxy-functionalized acrylic core-shell copolymer sold by Röhm and Haas under the brand name PARALOID®;
PBT: polybutylene terephthalate having an MFI of 20 (250° C./2.16 kg) sold by BASF under the brand name ULTRADUR® B4500.

DESCRIPTION OF THE DRAWINGS

FIG. 1 shows the notched Charpy impact strength of PBT containing AX 8900 (comparative example), PBT containing EXL 2314 (comparative example) and PBT containing simultaneously (according to the invention) AX 8900, Lotryl and a core-shell copolymer. The proportions by weight of the constituents of the impact modifier are in the following format: (2.8/11.2/6, AX8900/lotryl/core-shell) (example).

The impact strength values are indicated at four different temperatures for each composition. The values in FIG. 1 are also given in TABLE 1 below.

TABLE 1

| | Notched Charpy impact strength (kJ/m$^2$) | | | |
|---|---|---|---|---|
| Impact modifier | T = 23° C. | T = 0° C. | T = −20° C. | T = −40° C. |
| AX 8900 | 76.4 | 17 | 9 | 6.5 |
| 2.8/11.2/6 AX 8900/Lotryl/EXL 2314 | 73 | 20.5 | 14.5 | 9.1 |
| 2.8/11.2/6 AX 8900/Lotryl/E920 | 57.2 | 18 | 14 | 11.3 |
| 1.4/12.6/6 AX 8900/Lotryl/EXL 2314 | 63.7 | | | 10.4 |
| 1.2/4.8/14 AX 8900/Lotryl/EXL 2314 | 81.7 | | | 10.1 |
| EXL 2314 | 61.5 | 15.4 | 9.8 | 7 |

FIG. 2 shows the MFI of the above compositions containing the various impact modifiers and, in addition, the MFI of the PBT without any modifier: "pure PBT". The values are also given in TABLE 2 below.

TABLE 2

| MFI (250° C./2.16 kg) | COMPOSITION |
|---|---|
| 0.63 | PBT + AX 8900 |
| 4.1 | PBT + 2.8/11.2/6 AX 8900/Lotryl/EXL 2314 |
| 6.5 | PBT + 2.8/11.2/6 AX 8900/Lotryl/E920 |
| 5.7 | PBT + 1.4/12.6/6 AX 8900/Lotryl/EXL 2314 |
| 4.4 | PBT + 1.2/4.8/14 AX 8900/Lotryl/EXL 2314 |
| 7.4 | PBT + EXL 2314 |
| 20 | Pure PBT |

It may be clearly seen that the modifier of the invention gives better impact, particularly cold impact, results than AX 8900 or EXL 2314. However, the MFI is lower than with EXL 2314 used alone and much higher than with AX 8900 used alone, but easily sufficient for injection moulding.

FIG. 3 shows the notched Charpy impact strength at +23° C. for PBT containing, as impact modifier, either AX 8900, or Lotryl, or a mixture of these impact modifiers. These compositions are not according to the invention. FIG. 4 shows the impact strengths of the same compositions for other temperatures. The values are also given in TABLES 3 and 4.

TABLE 3

| AX 8900/Lotryl proportions | | Notched Charpy impact strength |
|---|---|---|
| AX 8900 | Lotryl | (temperature 23° C.) |
| 100 | 0 | 76.4 |
| 70 | 30 | 65.7 |
| 30 | 70 | 60.35 |
| 20 | 80 | 53.9 |
| 10 | 90 | 15 |
| 0 | 100 | 5 |

TABLE 4

| PBT + 20% | Notched Charpy impact strength | | |
|---|---|---|---|
| (AX 8900 + Lotryl) | T = 0° C. | T = −20° C. | T = −40° C. |
| 100/0 AX 8900/Lotryl | 17 | 9.1 | 6.2 |
| 70/30 AX 8900/Lotryl | 18.9 | 13.4 | 8.2 |
| 30/70 AX 8900/Lotryl | 15.9 | 13.4 | 8.75 |
| 20/80 AX 8900/Lotryl | 14.6 | 12 | 8.2 |
| 10/90 AX 8900/Lotryl | | | 7.5 |
| 0/100 AX 8900/Lotryl | | | 3.6 |

FIG. 5 shows the MFI of the above compositions containing the various impact modifiers and also the MFI of the PBT without a modifier: "pure PBT". The values are also given in TABLE 5 below.

TABLE 5

| PBT + 20% (AX 8900 + Lotryl) | MFI (250° C./2.16 kg) |
|---|---|
| 100/0 AX 8900/Lotryl | 0.63 |
| 70/30 AX 8900/Lotryl | 1.5 |
| 30/70 AX 8900/Lotryl | 2.7 |
| 20/80 AX 8900/Lotryl | 3.6 |
| 10/90 AX 8900/Lotryl | 5.5 |
| 0/100 AX 8900/Lotryl | 12 |
| Pure PBT | 20 |

Comparing FIG. 1 with FIG. 4, it may be seen that, with the modifier of the invention, a better impact strength is obtained, particularly at 0° C. and below 0° C., while still having a higher MFI.

FIG. 6 shows the notched Charpy impact strength at −40° C. for PBT containing, as impact modifier, either AX (AX8900 or AX8930), or a core-shell (EXL2314 or E920) or a mixture of these impact modifiers—these compositions are not according to the invention.

FIG. 7 shows the impact strength of these same compositions at +23° C. In these FIGS. 6 and 7, the epoxide-based copolymer has been denoted by AX and the core-shell by CS. The values are also given in TABLE 6 and TABLE 7.

TABLE 6

| PBT + 20% (AX + CS) AX = AX 8900 or | Notched Charpy impact strength at −40° C. | | | |
|---|---|---|---|---|
| AX 8930 CS = EXL 2314 or E920 | AX 8900/ EXL 2314 | AX 8900/ E920 | AX 8930/ EXL 2314 | AX 8930/ E920 |
| 100/0 AX/CS | 6.2 | 6.2 | 5 | 5 |
| 70/30 AX/CS | 9.8 | 10 | 8.8 | 9.9 |
| 30/70 AX/CS | 7.8 | 14.75 | 7.1 | 9.8 |
| 20/80 AX/CS | 9.2 | 10.25 | | |
| 10/90 AX/CS | | 13.8 | | |
| 0/100 AX/CS | 6.75 | 8.2 | 6.75 | 8.2 |

TABLE 7

| PBT + 20% (AX + CS) AX = AX 8900 or | Notched Charpy impact strength at +23° C. | | | |
|---|---|---|---|---|
| AX 8930 CS = EXL 2314 or E920 | AX 8900/ EXL 2314 | AX 8900/ E920 | AX 8930/ EXL 2314 | AX 8930/ E920 |
| 100/0 AX/CS | 76.4 | 76.4 | 55.2 | 55.2 |
| 70/30 AX/CS | 99 | 62.2 | 67.5 | 61 |
| 30/70 AX/CS | 91.8 | 88.9 | 82.6 | 88.4 |
| 20/80 AX/CS | 87.6 | 79.5 | | |
| 10/90 AX/CS | | 80 | | |
| 0/100 AX/CS | 62 | 18 | 62 | 18 |

FIG. 8 shows the MFI of the above compositions containing the various impact modifiers and also the MFI of the PBT without a modifier: "pure PBT". The values are also given in TABLE 8 below.

TABLE 8

| PBT + 20% (AX + CS) AX = AX 8900 or AX 8930 CS = EXL 2314 or E920 | MFI (250° C./2.16 kg) no change with the type of AX and CS |
|---|---|
| 100/0 AX/CS | 0.63 |
| 70/30 AX/CS | 0.9 |
| 30/70 AX/CS | 1.63 |
| 20/80 AX/CS | 3.5 |
| 10/90 AX/CS | 3 |
| 0/100 AX/CS | 7.4 |
| Pure PBT | 20 |

Comparing FIG. 1 with FIG. 6, it may be seen that the modifier of the invention results in superior cold impact strength values. By examining FIGS. 2, 5 and 8, it may be seen that the MFI of those compositions of the invention in which A, B and C are combined is unexpectedly higher in comparison with that obtained by combining the copolymers in pairs: A with B or B with C.

The examples below were produced with PBT/impact modifier compositions such as those defined in % by weight in TABLE 9. This table also give other values, such as the MFI of the compositions appearing therein, together with their impact strength by measuring the notched Izod impact behaviour according to the standard defined above at various temperatures T (T 20° C., −20° C., −30° C. and −40° C.).

The compositions exemplified below were produced with the following products:
PBT: polybutylene terephthalate having an MFI of 8.4 (250° C./5 kg) sold under the brand name CELANEX®1600A by Ticona;
Lotryl: ethylene-butyl acrylate copolymer comprising 30% by weight of acrylate and having an MFI of 2(190° C./2.16 kg);

AX8900: composition defined above;
AM939: core-shell with an n-octyl acrylate core and a methyl methacrylate shell in proportions of 70 to 90% by weight for the n-octyl acrylate and 10 to 30% for the methyl methacrylate.

In view of the values listed in TABLE 9, it may be clearly seen that the compositions which include the impact modifier according to the invention gives better impact strength results within an exemplified temperature range going from room temperature to −40° C., unlike the compositions comprising only AX8900 (comparative 1) or AM939 (comparative 2) as impact modifier.

Impact strength tests were also carried out with compositions not according to the invention comprising two impact modifiers. These are the compositions called comparatives 3, 5 and 6 in TABLE 9. When the impact strength results obtained with such compositions are compared with the results obtained with the compositions comprising the trio AM939/Lotryl/AX8900, it is found that the use of the impact modifier according to the invention gives very good impact strength values over the temperature range exemplified, which is not the case with the comparatives 5 and 6, and also gives very good melt flow index results, which is not the case with comparative 3.

A synergy effect is therefore found between the protagonists of the AM939/Lotryl/AX8900 trio of the impact modifier according to the invention making it possible to achieve an appreciable compromise between impact strength and melt flow of the thermoplastic polyester compositions according to the invention.

The examples below were produced with PET/impact modifier compositions such as those defined in % by weight in TABLE 10. This table also give other values such as the MFI of the compositions appearing therein and their impact strength by measuring the notched Charpy impact behaviour according to the standard defined above at various temperatures T (T=20° C., 0° C. and −30° C.).

The examples below were made with the following products:

PET: polyethylene terephthalate having an MFI of 40–50 (275° C./2.16 kg) sold under the brand name ESTAPAK®9921 by Eastman;

AX8900: composition defined above;

E920: composition defined above;

AM939: composition defined above;

Lotryl: ethylene-butyl acrylate copolymer comprising 30% by weight of acrylate and having an MFI of 2 (190° C./2.16 kg).

In view of the MFI and impact strength results reported in TABLE 10, it may be seen that the compositions comprising only AX8900 (comparatives 1) and only the duo Lotryl/AX8900 (comparative 4) as impact modifier offer good impact strength to the detriment of melt flow index, which is mediocre. Furthermore, it is found by studying the results of the compositions comprising only a core-shell (AM939 in the case of comparative 2 or E920 in the case of comparative 3) as impact modifier that these compositions offer a poor impact strength but a better melt viscosity.

Analysis of our results obtained with compositions comprising the impact modifier according to the invention clearly shows an improvement in the viscosity over comparatives 1 and 4 together with an improvement in the impact strength over comparatives 2 and 3.

Our results indubitably demonstrate that our impact modifier is superior to the comparative impact modifiers and sheds light on the synergistic effect of the CS/Lotryl/AX8900 compounds, forming an impact modifier according to the invention, on the melt flow index and the impact strength of our thermoplastic polyester compositions.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The foregoing references are hereby incorporated by reference.

TABLE 9

| PBT | AM939 | Lotryl | AX8900 | AM939/Lotryl/AX8900 | | MFI (g/10 min) | Impact strength (foot.pound/inch) | | | |
|---|---|---|---|---|---|---|---|---|---|---|
| | | | | | | | T = 20° C. | T = −20° C. | T = −30° C. | T = −40° C. |
| 100% | 0% | 0% | 0% | 0/0/0 | PBT Base | 37.9 | 1–2 | — | — | — |
| 80% | 0% | 0% | 20% | 0/0/100 | Comparative 1 | 6.7 | 17.6 | 2.9 | — | — |
| 75% | 25% | 0% | 0% | 100/0/0 | Comparative 2 | 14.6 | 3.1 | — | — | — |
| 75% | 12.5% | 0% | 12.5% | 50/0/50 | Comparative 3 | 0.6 | 25 | 23 | 23 | 18 |
| 75% | 0% | 25% | 0% | 0/100/0 | Comparative 4 | 38.4 | 1.3 | — | — | — |
| 75% | 0% | 12.5% | 12.5% | 0/50/50 | Comparative 5 | 11.7 | 15.1 | 2.6 | — | — |
| 75% | 12.5% | 12.5% | 0% | 50/50/0 | Comparative 6 | 18.7 | 4.4 | — | — | — |
| 75% | 7.5% | 12.5% | 5% | 30/50/20 | | 7.2 | | | | |
| 75% | 7.5% | 7.5% | 10% | 30/30/40 | | 4.4 | | | | |
| 75% | 7.5% | 5% | 12.5% | 30/20/50 | | 4.6 | | | | |
| 75% | 12.5% | 7.5% | 5% | 50/30/20 | | 5.5 | 20 | 18 | 14.5 | 3 |
| 75% | 12.5% | 6.25% | 6.25% | 50/25/25 | | 4.1 | 21.5 | | 17.5 | 4 |
| 75% | 12.5% | 5% | 7.5% | 50/20/30 | | 3.4 | 18.5 | | 19 | 4 |
| 75% | 15% | 5% | 5% | 60/20/20 | | 4.7 | | | | |
| 75% | 15% | 3% | 7% | 60/12/28 | | 3.2 | 22.5 | | 18.5 | 3.5 |
| 75% | 17.5% | 4.5% | 3% | 70/18/12 | | 9.1 | | | | |
| 80% | 10.0% | 4.0% | 6.0% | 50/20/30 | | 5.7 | 22.5 | 17.5 | 6 | |
| 80% | 10.0% | 5.0% | 5.0% | 50/25/25 | | 4.9 | 22 | 17 | 3 | |
| 80% | 10.0% | 6.0% | 4.0% | 50/30/20 | | 6.2 | 21 | 14.5 | 3 | |
| 70% | 15.0% | 6.0% | 9.0% | 50/20/30 | | 2.8 | 21 | | 23 | 9 |
| 70% | 15.0% | 7.5% | 7.5% | 50/25/25 | | 3.3 | 20.5 | | 21 | 7 |
| 70% | 15.0% | 9.0% | 6.0% | 50/30/20 | | 3.7 | 19.5 | | 18 | 6.5 |

TABLE 10

| PET | AM939 | E920 | Lotryl | AX8900 | AM939/Lotryl/AX8900 | MFI (g/10 min) | Impact strength (kJ/m²) | | |
|---|---|---|---|---|---|---|---|---|---|
| | | | | | | | T = 20° C. | T = 0° C. | T = −30° C. |
| 100% | | | | | PET Base | 40–50 | 3.2 | 3.2 | 3.2 |
| 80% | | | | 20% | Comparative 1 | 1.8 | 22 | 15 | 7 |
| 80% | 20% | | | | Comparative 2 | 7 | 8 | 7.3 | 4.7 |
| 80% | | 20% | | | Comparative 3 | 9 | 5.4 | 4.7 | 3 |
| 80% | | | 17% | 3% | Comparative 4 | 1.6 | 19.9 | 15.1 | 9.5 |
| 80% | | 6% | 11% | 3% | 28.6/57.1/14.3 | 5 to 6 | 12.6 | 10.7 | 7.2 |
| 80% | | 9% | 9% | 3% | 42.9/42.9/14.3 | 7 to 8 | 12 | 10.8 | 6.7 |
| 80% | 9% | | 9% | 3% | 42.9/42.9/14.3 | 2 | 12.7 | 11.3 | 7.6 |
| 80% | | 11% | 6% | 3% | 57.1/28.6/14.3 | 2 to 3 | 10.1 | 8.1 | 5.3 |
| 80% | 11% | | 6% | 3% | 57.1/28.6/14.3 | 6 | 10.5 | 9.3 | 5.8 |

What is claimed is:

1. Thermoplastic polyester compositions free of polycarbonate, comprising, by weight, the total being 100%:
   60 to 99% of a thermoplastic polyester;
   1 to 40% of an impact modifier comprising:
   (a) a core-shell copolymer (A);
   (b) an ethylene copolymer (B) comprising ethylene, an unsaturated carboxylic acid anhydride and an ester of an unsaturated carboxylic acid (B1); and
   (c) a copolymer (C) selected from copolymers consisting of ethylene and alkyl(meth)arcylate (C1), optionally neutralized copolymers consisting of ethylene and (meth)acrylic acid (C2) and blends thereof.

2. Compositions according to claim 1, wherein the polyester is PET or PBT and mixtures thereof.

3. Compositions according to claim 1, comprising from 0 to 500 parts by weight of copolyetherester per 100 parts of thermoplastic polyester.

4. Compositions according to claim 1, wherein the copolymer (A) comprises an elastomer core, advantageously an n-octyl acrylate core, and at least one thermoplastic shell, advantageously a methyl methacrylate shell.

5. Compositions according to claim 1, wherein the copolymers (B1) are ethylene-alkyl (meth)acrylate-maleic anhydride copolymers which comprise from 0.2 to 10% by weight of maleic anhydride and from 5 to 40% by weight of alkyl (meth)acrylate.

6. Compositions according to claim 1, comprising, per 100 parts by weight, 65 to 95 parts and 35 to 5 parts of polyester and of impact modifier, respectively.

7. Compositions according to claim 1, wherein the proportions by weight of (A), (B) and (C) are 15 to 80, 5 to 60 and 5 to 80%, respectively, and (A)+(B)+(C)=100%.

8. Compositions according to claim 7, wherein the proportions by weight of (A), (B) and (C) are 20 to 35, 40 to 60 and 10 to 40%, respectively, and (A)+(B)+(C)=100%.

9. Compositions according to claim 7, wherein the proportions by weight of (A), (B) and (C) are 25 to 35, 5 to 10 and 60 to 70%, respectively, and (A)+(B)+(C)=100%.

10. Compositions according to claim 7, wherein the proportions by weight of (A), (B) and (C) are 40 to 75, 10 to 35 and 10 to 35%, respectively, and (A)+(B)+(C)=100%.

11. Compositions according to claim 5, wherein the amount of alkyl (meth)acrylate is from 5 to 40%.

12. Thermoplastic polyester compositions comprising, by weight, the total being 100%:
   60 to 99% of a thermoplastic polyester;
   1 to 40% of an impact modifier comprising:
   (a) a core-shell copolymer (A);
   (b) an ethylene copolymer (B) comprising ethylene, an unsaturated carboxylic acid anhydride and an ester of an unsaturated carboxylic acid (B1); and
   (c) a copolymer (C) selected from copolymers consisting of ethylene and alkyl(meth)acrylate (C1), optionally neutralized copolymers consisting of ethylene and (meth)acrylic acid ethylene (C2) and blends thereof,
   wherein the proportions by weight of (A), (B) and (C) are 15 to 80, 5 to 60 and 5 to 80%, respectively, and (A)+(B)+(C)=100%.

13. Compositions according to claim 12, comprising from 0 to 300 parts by weight of polycarbonate per 100 parts of thermoplastic polyester.

14. Polyethylene terephthalate compositions free of polycarbonate, comprising, by weight, the total being 100%:
   60 to 99% of polyethylene terephthalate;
   1 to 40% of an impact modifier comprising:
   (a) a core-shell copolymer (A);
   (b) an ethylene copolymer (B) comprising ethylene, an unsaturated carboxylic acid anhydride and an ester of an unsaturated carboxylic acid (B1), ethylene-unsaturated epoxide copolymers (B2) and blends thereof; and
   (c) a copolymer (C) selected from copolymers consisting of ethylene and alkyl(meth)acrylate (C1), copolymers consisting of ethylene and (meth)acrylic acid (C2) and blends thereof.

15. Compositions according to claim 14, wherein the ethylene-unsaturated epoxide copolymers (B2) are ethylene-alkyl (meth)acrylate-unsaturated epoxide copolymers obtained by copolymerization of the monomers and contain from 0 to 40% by weight of alkyl (meth)acrylate and up to 10% by weight of unsaturated epoxide.

* * * * *